Patented Oct. 27, 1953

2,657,147

UNITED STATES PATENT OFFICE 2,657,147

COMPOSITION FOR VULCANIZING RUBBER

Edward A. Van Valkenburgh, Greene, N. Y.

No Drawing. Application November 23, 1948,
Serial No. 61,743

2 Claims. (Cl. 106—123)

1

This invention relates to improvements in tall oil acid compositions particularly useful in the compounding and vulcanization of rubber.

The compositions of the present invention are stabilized liquid compositions of tall oil acids or modified tall oil acids with aniline and with a non-volatile hydrocarbon solvent or diluent in regulated proportions. In general, the new compositions are made by compounding or combining tall oil acids with aniline in the proportions of about 2–20% by weight of aniline based on the weight of the tall oil acids and more advantageously about 10–15% of aniline based on the tall oil acid; and with the use of an amount of hydrocarbon solvent or diluent corresponding to about 10–30%, and more advantageously around 20–25% by weight of the tall oil acids and aniline used.

The new compositions are valuable as detackifying agents to provide raw processability of highly loaded GR–S synthetic rubber compositions and also for use in hard rubber compositions, whether prepared from natural rubber or from GR–S synthetic rubber or from blended mixtures. The composition is useful as a plasticizer and detackifier during rubber compounding.

The present invention enables tall oil acids, especially crude normally semi-solid tall oil acids to be advantageously used in the compounding and vulcanization of rubber with particular advantage in the mixing and vulcanization of the rubber, both from the standpoint of improved raw processability prior to vulcanization and also with respect to contributing distinctive desirable cured properties, particularly where large amounts of pigments or fillers are used.

Tall oil acids are produced as a by-product from the paper pulp industry and may have an acid number of e. g. around 165 and may contain, e. g., around 45% of cyclic rosin acids, around 45% of straight chain fatty acids, and around 10% of sterols and other higher alcohols. Depending upon the method of separation and refining the composition may vary somewhat but in general will contain relatively large proportions of both rosin acids and fatty acids. On standing at ordinary temperatures tall oil acids usually separate into a lower semi-solid layer and an upper liquid layer. Such a product presents difficulties for use in rubber compounding. When tall oil acids are heated to relatively high temperatures for sufficient periods of time and particularly with the presence of catalysts some of the tall oil acids may undergo modification but the modified acids will still contain relatively large proportions of fatty acids and resin acids or modified acids resulting from the heat treatment.

It is advantageous to subject crude tall oil to heat treatment prior to compounding with the aniline and hydrocarbon solvent. By heating crude tall oil to temperatures of 325–375° F. with efficient agitation, for at least half an hour, the solid and semi-solid particles present in the crude or unrefined tall oil are completely melted and the oil is stabilized. The beneficial stabilizing effect of this heat treatment may be partly chemical in case dehydrogenation or dihydrogenation takes place to a limited extent. Whatever the explanation, I have found it important to subject crude tall oil to such heat treatment to form a homogeneous liquid free from suspended particles prior to the addition of the aniline thereto.

The aniline is advantageously added to the hot heat treated tall oil below the surface thereof and with continued agitation to insure thorough blending of the aniline with the tall oil. The non-volatile hydrocarbon solvent or diluent can be added to the hot tall oil prior to the addition of the aniline or subsequent thereto.

The proportion of aniline and tall oil can be varied and somewhat different products obtained. In general, at least 2% of aniline by weight is used with the tall oil and better results are obtained with 5% or more of aniline. Particularly advantageous compositions are obtained with around 10 to 15% aniline based on the weight of the tall oil acids.

The proportions of aniline and tall oil used are such that the aniline is radically less than that which is equivalent to the tall oil acids. Ordinarily the aniline will be less than two-thirds the equivalent amount and particularly advantageous products are obtained with the use of proportions of aniline and tall oil corresponding to around 40–50% of the equivalent amount. The minimum amount of aniline is in general around 10% or more.

When the aniline is added to the hot liquid tall oil acids, there does not appear to be any heat of reaction generated, and instead of observing a rise in temperature such as might be expected, I have observed a falling in temperature where the aniline was at a lower temperature than the hot tall oil acids. The extent to which the aniline actually reacts with and combines with the tall oil acids to form soaps and the extent to which the aniline may remain in an uncombined state is difficult to determine but I have been led to believe that the aniline is present to a considerable extent in a free or uncombined state in the tall oil-aniline composition. To the extent that the aniline reacts with the tall oil acids there appears to be a preferential or selective reaction with the fatty acids of the tall oil rather than with the resin acids. With the use of an amount of aniline corresponding to approximately half the theoretical amount required i. e., half the molecular equivalent amount, it is evident that the aniline cannot react with more than approximately half of the tall oil acids so in any event a large proportion of the tall oil acids remains in a free or uncombined state.

The non-volatile hydrocarbon solvents or diluents are non-volatile at the temperature of vulcanization such as medium coal tar oil or light petroleum oil, such as medium process oil, or mixtures of such hydrocarbon oils. Such hydrocarbon oils have a valuable solvent or diluent effect in maintaining the composition as a homogeneous liquid and preventing separation or settling out of solid constituents therefrom, giving homogeneous liquid products well adapted for use in rubber compounding.

The proportions of hydrocarbon solvents can be varied as above indicated from around 10 to 30% of the amount of tall oil and aniline used. I have found it more advantageous to use around 20 to 25% of such hydrocarbon oils.

For certain purposes the use of non-volatile coal tar oil is advantageous due to its unsaturation, giving resulting compositions of high unsaturation as indicated by their iodine number. Such compositions are sulfur-reactive and are desirable for use in highly loaded and therefore richly plasticized hard rubber compositions whether made from synthetic or natural rubber, to retard and minimize bloom during the curing in the mold as in the manufacture of hard rubber battery box containers.

In the mixing and processing of non-black GR-S synthetic rubber compositions, such as those loaded with clay and calcium silicate, for example, it is well known that difficulty is encountered as in the reworking of scrap stock on an embossing calender on account of the excessive tackiness of the raw stock due to sticking to the surface of the mill and calender rolls. The composition of the present invention is advantageously used with such compositions with minimizing of the objections mentioned.

The proportion of the new compositions will be further illustrated by the following examples and procedure. It is important, as above stated, to melt all of the solid components in the tall oil mixture by a preliminary heat treatment prior to the incorporation of the aniline.

The tall oil is thus advantageously heated to an elevated temperature around 125 or 130° C. with mechanical stirring for a period of a half hour or more, preferably in a closed vessel, prior to the addition of the aniline. This period of heating can be somewhat reduced by adding compatible hydrocarbon oil after most of the solid sludge in the tall oil has been melted and by continuing the heating and stirring until a homogeneous liquid is obtained free from suspended matter. All the stabilizing oils can be added subsequently with the aniline, after the heat treatment of the tall oil and after it has been completely melted. It is important to make sure that any solid rosin acid particles in the tall oil have been completely melted or dissolved and a uniform liquid product obtained prior to the addition of the aniline.

The aniline is advantageously added to the hot tall oil beneath the surface thereof and with effective stirring, at a temperature around 130° C., and the stirring is continued for another half hour or so after the aniline has been added to effect thorough and uniform distribution or dispersion of the aniline throughout the tall oil.

Compositions may thus be made from crude petroleum acids and aniline in the following proportions:

| Composition | #1 | #2 | #3 |
| --- | --- | --- | --- |
| Tall Oil | 80 | 70 | 75 |
| Aniline | 10 | 10 | 10 |
| Coal Tar Oil | 10 | 10 | 10 |
| Petroleum Oil (medium process oil) | | 10 | 5 |
| | 100 | 100 | 100 |

With the first composition containing only 10% of hydrocarbon solvent or about 11% of the weight of the tall oil acid and aniline, the composition is stable under all ordinary temperature conditions but after long storage in winter-time has tended to develop solid sedimentation such that the product should be warmed up again before use. With composition #2 no such tendency toward sedimentation has been observed. This composition contains 20 parts of hydrocarbon solvent or an amount corresponding to about 25% of the tall oil and aniline used. The third composition has also shown no tendency toward sedimentation and is somewhat more sulfur-reactive than composition #2.

The following examples illustrate the use of composition #1 in a non-black mixed synthetic GR-S and natural crude rubber stock, highly loaded with calcium silicate, in comparison with a similar stock containing a mixture of para-coumarone-indene resin and petroleum oil. Two compounds are made as follows:

| Compound | A | B |
| --- | --- | --- |
| G R-S Synthetic Rubber | 50.0 | 50.0 |
| Crude Rubber | 50.0 | 50.0 |
| Zinc Oxide | 5.0 | 5.0 |
| Sulfur | 3.5 | 3.5 |
| Santocure (activated mercapto benzo-thiazole) | 1.0 | 1.0 |
| Calcium Silicate | 150.00 | 150.00 |
| P-Coumarone-Indene Resin | 10.0 | |
| Petroleum Oil | 10.0 | |
| Composition #1 | | 20.0 |

The excellent plasticizing efficiency of the tall oil composition of the present invention as well as its permanent softening effect is shown by tests made on the stock both before vulcanization and after. Scott plasticity determinations made on the raw stocks before vulcanization gave the following results (compression in 0.001 inch):

Compound A _____ 2
Compound B _____ 112

These tests show that the composition #1 is far superior as a plasticizing and softening agent than the resin and petroleum oil which it replaced.

The above compounds were vulcanized at 280° F. for 15, 30, 60 and 90 minutes, respectively, and the vulcanized compounds gave the following "shore creep" results, as determined with the Shore type "A" durometer equipped with a two-pound deadweight load. This test measured the comparative change in cured hardness values after 0.5 and 30 seconds, respectively, and gave the following results:

| Cures at 280° F. | Compound | | | |
|---|---|---|---|---|
| | A | | B | |
| | Shore Hardness After— | | | |
| | 0.5″ | 30″ | 0.5″ | 30″ |
| 15 min | 87 | 85 | 71 | 66 |
| 30 min | 90 | 85 | 75 | 69 |
| 60 min | 90 | 85 | 75 | 69 |
| 90 min | 92 | 88 | 76 | 69 |

These comparative cured shore hardness results illustrate the remarkable permanent softening effect of the new composition and its persistence after cure.

These same two compounds gave the following comparative 300% cured modulus values:

| Cures at 280° F. | Compound | |
|---|---|---|
| | A | B |
| 15 min | 1,248 | 822 |
| 30 min | 1,404 | 851 |
| 60 min | 1,361 | 808 |
| 90 min | 1,305 | 723 |

These test results show that compound A, containing the resin oil mixture, is consistently much stiffer throughout the range of the cures than is compound B, in which composition #1 is used.

The use of the above compounds in the commercial production of non-black synthetic GR-S soles for tennis shoes shows that compound B containing the new tall oil aniline composition provided greatly improved liberation of the compound for metal calender rolls. In highly loaded black natural rubber boots the compound containing the new tall oil acid composition gave an improved non-scorching helpful initial retardation of cure and in high grade hard rubber compounds containing a large percentage of ground hard rubber dust, the use of the new tall oil-aniline composition gave improved wetting and coalescing of the hard rubber dust into the natural rubber matrix.

Composition #2 above is somewhat less sulfur-reactive than composition #1, having an approximate iodine number of 126 as compared with an approximate iodine number of 133 for the more highly unsaturated composition #1.

The following example gives comparative results with compositions 1 and 2 above in natural rubber tire tread stock compounded as follows:

| Compound | C | D |
|---|---|---|
| Smoked Sheets | 100 | 100 |
| Medium Processing Channel Black | 50 | 50 |
| Zinc Oxide | 5 | 5 |
| Sulfur | 3.0 | 3.0 |
| Phenyl Beta Naphthyl Amine | 1.5 | 1.5 |
| Mercapto Benzo Thiazyl Disulfide | 0.8 | 0.8 |
| Stearic Acid | 3.0 | 3.0 |
| Composition #1 | 5.0 | |
| Composition #2 | | 5.0 |

Prior to vulcanization, when subjected to a Mooney scorch test at 250° F., compound C gave the "first scorch" result after 38 minutes, whereas compound D "scorched" in 35 minutes, indicating that composition #2 is substantially more efficient as an activator than composition #1.

This same comparative effect is confirmed by 500% modulus values and relative tensile strength data, after the above two natural rubber tire tread compounds, respectively, were cured at 281° F. for 15, 30, 45, 60, 90, 120 and 180 minutes, respectively, as follows:

| Cure at 281° F. | 500% Modulus (lbs. per sq. in.) | |
|---|---|---|
| | Compound C | Compound D |
| 15 min | 880 | 980 |
| 30 min | 2,100 | 2,200 |
| 45 min | 2,670 | 2,690 |
| 60 min | 2,890 | 2,920 |
| 90 min | 3,210 | 3,280 |
| 120 min | 3,360 | 3,400 |
| 180 min | 3,440 | 3,440 |

| Cure at 281° F. | Tensile Strength (lbs. per sq. in.) | |
|---|---|---|
| | Compound C | Compound D |
| 15 min | 2,240 | 2,370 |
| 30 min | 4,080 | 3,960 |
| 45 min | 4,330 | 4,320 |
| 60 min | 4,390 | 4,360 |
| 90 min | 4,190 | 4,180 |
| 120 min | 4,130 | 3,850 |
| 180 min | 3,960 | 3,980 |

The above data on the cured products shows that composition #2, which contains somewhat less tall oil, is a more efficient cure-activator. Because of its somewhat lower iodine number, it is less sulfur-reactive.

Composition #3 above is for some purposes more advantageous than composition #2, for example, as a sulfur-reactive additive for asphaltum oil in hard rubber compounding, to minimize oil bloom during vulcanization and resulting in undesirable smudging of the mold.

The foregoing examples illustrate the advantages of the use of the new compositions in compounding and vulcanizing synthetic and natural rubbers. It will be understood that variations can be made in the particular formulas and also in the percentages of the new compositions used. It is one advantage of the new compositions that they may be incorporated directly into the synthetic or natural rubber mix according to the usual methods of compounding. They may be compounded directly into the gum matrix, e. g., on a two roll mill or in a Banbury mixer or they may be incorporated indirectly by preliminary dispersion in liquid synthetic rubber latex with subsequent coagulation, or they may be preliminarily mixed with the carbon black or other powders used in rubber compounding before adding them with the admixed powders to the rubber compound.

This application is a continuation-in-part of my prior application Serial No. 590,109, filed April 19, 1945, now abandoned.

I claim:

1. A composition useful in the compounding and vulcanization of rubber consisting essentially of tall oil acids compounded with from 2 to 20% of aniline based on the weight of the tall oil acids, and with an amount of compatible liquid hydrocarbon solvent of from 10 to 20% of the weight of the tall oil and aniline, said composition being a homogeneous liquid composition.

2. A composition useful in the compounding and vulcanization of rubber consisting essentially of heat treated crude tall oil acids compounded with from 10 to 15% of aniline based on the weight of the tall oil acids and an amount of compatible liquid hydrocarbon solvent of from 20 to 25% of the weight of the tall oil acids and aniline, said composition being a homogeneous liquid composition.

EDWARD A. VAN VALKENBURGH.

References Cited in the file of this patent

UNITED STATES PATENTS

| Number | Name | Date |
|---|---|---|
| 2,107,287 | Curran | Feb. 8, 1938 |
| 2,259,420 | Hills | Oct. 14, 1941 |
| 2,360,913 | Van Valkenburgh | Oct. 24, 1944 |

OTHER REFERENCES

Oil and Fat Industries, Dec. 1928, pp. 338–347, "Soaps from organic bases," by Trusler.